Dec. 6, 1955 W. R. FRANK 2,725,812
DISK GANG MOUNTING
Filed Feb. 15, 1952 2 Sheets-Sheet 1

*INVENTOR:*
WILLIAM R. FRANK
BY
*ATTORNEYS*

United States Patent Office 2,725,812
Patented Dec. 6, 1955

2,725,812

DISK GANG MOUNTING

William R. Frank, Bell, Calif., assignor to John Deere Killefer Company, Los Angeles, Calif., a corporation of California Application February 15, 1952, Serial No. 271,784

2 Claims. (Cl. 97—217)

The present invention relates generally to agricultural implements and more particularly to bearing means for the ground engaging and working elements of an agricultural implement, especially one in which such elements and the associated bearing means operate in or closely adjacent to the ground and are subject to intimate and continued contact with soil particles, dust, grit and the like.

The object and general nature of the present invention is the provision of new and improved bearing means and associated mounting means therefor, particularly constructed and arranged to be incorporated in an agricultural implement, such as a disk harrow. More specificallly, it is an important feature of this invention to provide a simplified bearing arrangement in which new and improved means is provided for connecting the bearing unit in supporting relation with the associated frame of the harrow or other implement, and a further feature of this invention is the provision of new and improved sealing means which serve to prevent dust, grit, and the like from entering the bearing. More specifically, it is a feature of this invention to provide sealing means so constructed and arranged to act between the housing, receiving the outer race of the associated bearing unit, and the axially extended portions of the inner race of the bearing, whereby the sealing means is effective at all times, even though there should be some eccentricity or other relative movement between the implement part receiving the inner bearing race and the inner race itself.

It is a feature of this invention to provide an improved mounting arrangement between the outer bearing housing and the implement frame of other parts. Particularly, the parts are so arranged that assembly and disassembly is made easy and quickly, yet when the parts are in normal connected position, accidental disconnection is virtually impossible.

These and other objects and advantages of the present invention will be apparent to those skilled in the art after a consideration of the following detailed description, taken in conjunction with the accompanying drawings, in which.

Figure 1:
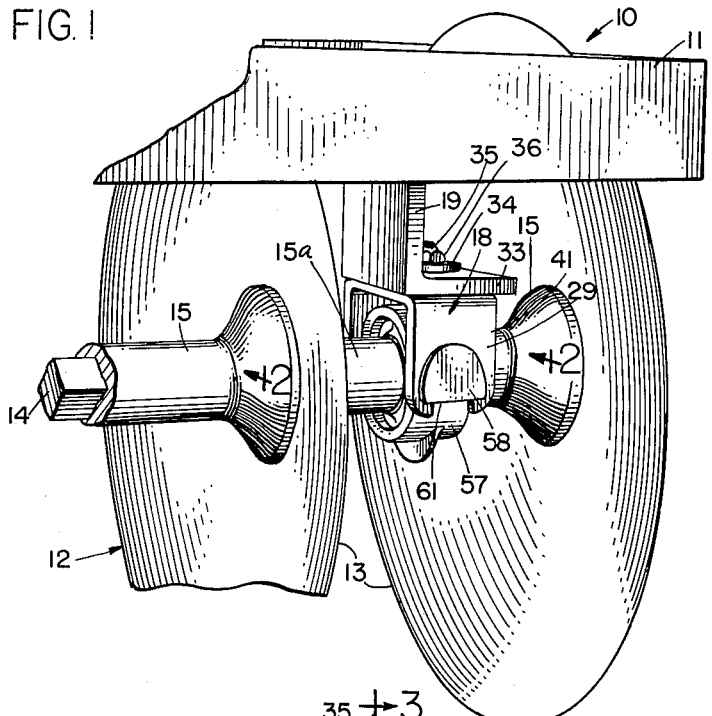
Figure 1 is a perspective view illustrating the present invention as incorporated in one of the bearings of a soil working implement, specifically a disk harrow.

Referring now to the drawings, particularly Figure 1, for the purpose of illustrating and describing the present invention the same has been shown as applied to a disk harrow 10 having a gang frame 11 in which a disk gang 12, including a plurality of disks 13, a gang bolt 14, and a plurality of disk-separating spacing means 15, is mounted for rotation, preferably by means of a gang bearing unit 18 connected to a bracket 19 that is fixed in any suitable way to and forms a part of the gang frame 11.

The present invention is particularly concerned with the bearing unit 18, and this unit will now be described.

The spacing means 15a that receives the bearing unit 18 comprises a pair of spacing spool sections, 21 and 22, each of which has a disk-engaging enlarged section 23 and a portion 24 of reduced diameter, there being a shoulder 25 between the reduced portion 24 and the enlarged spacing spool portion 23. The two associated spool portions 24 are substantially identical in dimension, and each spacing spool section 21 and 22 has an axial opening thereto shaped to receive and fit snugly on the gang shaft 14.

Figure 2:
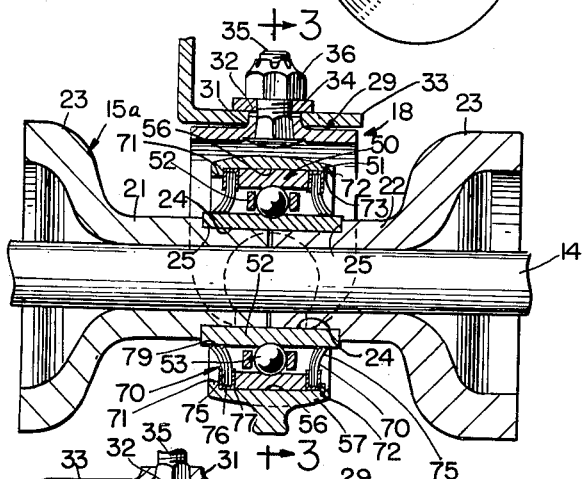
Figure 2 is a sectional view taken along a transverse vertical plane passing through the axis of the disk gang.
Figure 3:
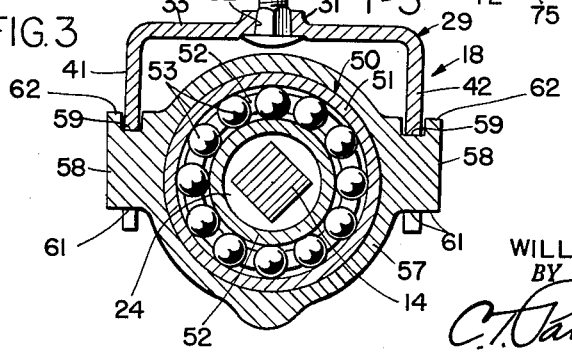
Figure 3 is a sectional view taken along a vertical fore-and-aft extending plane passing through the trunnion axes of the bearing.
Figure 4:
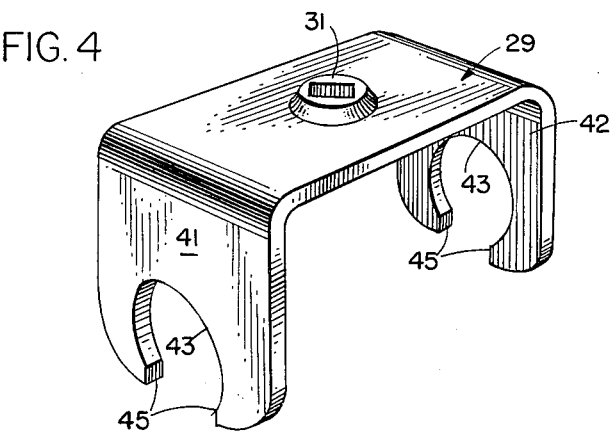
Figure 4 is a perspective view of the bearing yoke.

A bearing yoke 29 is formed as a generally U-shaped strap member, the central portion of which includes an upwardly disposed apertured boss 31 that extends upwardly through an opening 32 in the flange 33 of the frame bracket 19, as best shown in Figure 2. A bracket washer 34 is disposed on the upper side of the flange 33, and a bolt 35 extends upwardly through the yoke 29, the opening 32, and the washer 34 and receives a lock nut 36 or other suitable means for holding the parts together. The boss 31 is so dimensioned relative to the flange 33 that the yoke 29, when the bolt 35 and nut 36 are tightened, is capable of rocking about a vertical axis relative to the gang frame 11.

The U-shaped yoke member 29 has arms or end portions 41 and 42 that are notched, as at 43, to form trunnion-receiving sockets generally circular in form and having a diameter somewhat in excess of the width of the opening 45 that leads from the end of each arm into the associated socket opening 43.

An anti-friction bearing 50 is disposed about the axially inner end portions 24 of the spacing sleeve sections and comprises a relatively narrow outer bearing race 51, an inner sleeve or bearing race 52 that is materially greater in axial length than the outer bearing race 51, and a plurality of anti-friction balls 53 or the like between the two races. The internal diameter of the inner bearing race or sleeve 52 is substantially the same as the external diameter of the reduced spacing spool portions 24, and the shoulders 25 are so located that when the gang bolt nut is tightened on the gang 14 the shoulders 25 are drawn firmly against the ends of the inner bearing race or sleeve 52.

The outer relatively narrow bearing race 51 is disposed within an annular groove 56 formed in a generally circular bearing housing 57. The latter member is provided with laterally outwardly extending yoke-receiving trunnions 58. Each trunnion 58 includes a generally cylindrical section 59, the diameter of which is substantially equal to the diameter of the yoke arm openings or sockets 43, and the lower side of each trunnion section 59 is flattened, as at 61, so that the distance between the uppermost point of the cylindrical section 59 and the lower flattened section 61 thereof is substantially the same or at least no greater than the width of the yoke arm openings 45.

Figure 5:
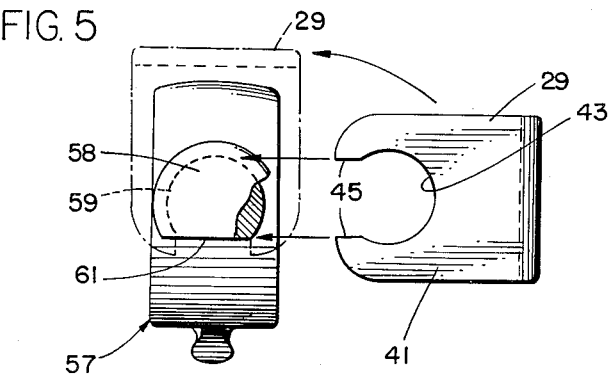
Figure 5 is an enlarged fragmentary view showing the bearing yoke in the position it occupies, relative to the bearing housing, when assembling the yoke and housing for incorporation in a harrow or other implement.

The purpose of this particular arrangement is to facilitate assembly of the yoke member 29 and the bearing housing member 57. To effect this assembly, all that it is necessary to do is to turn the yoke 29 over into a horizontal position, as shown in full lines in Figure 5, and then the notched ends of the yoke arms 41 and 42 may be passed over the trunnions 58, after which the yoke 29 is then swung up into a vertical or normal position, with the upper or inner portions of the sockets 43 resting on the cylindrical trunnions 57 of the bearing housing, thereby providing a sturdy support for the gang frame and associated parts on the bearing housing, yet the yoke cannot, so long as it is vertical, be separated from the associated bearing housing, since the width of the yoke arm openings 45 is less than the horizontal diameter of the yoke trunnions. Each of the latter is provided with an outer flanged section 62 which prevents any excessive axial displacement of the yoke relative to the bearing housing.

The bearings of such implements as the disk harrows and the like operate normally in substantially direct contact with the soil being worked, and therefore some means must be provided for keeping all of the dirt, dust, grit and the like out of the bearing parts. Therefore, according to the principles of the present invention, I provide a pair of bearing seals 70, mounting the same within the groove 56 of the bearing housing 57 on opposite sides of the outer bearing race 51. To this end, the bearing housing 57 at one side carries a radially inwardly extending flange 71, and at the other side the bearing housing is provided with a groove 72 in which a snap ring 73 is adapted to be placed.

Each of the bearing seals comprises three sealing members 75 held within an enclosing collar 76. Each of the sealing members 75 comprises a normally flat annular ring or diaphragm, preferably formed of rubber or rubber-like material and a flat metal ring to which the rubber-like ring is securely attached, as by being bonded thereto. The central opening 79 of each of the flexible members 78 is substantially smaller than the outer diameter of the inner bearing race or sleeve 52 so that when the sealing members 70 are forced into position over the ends of the inner bearing race or sleeve 52, the radially inner portions of the rubber-like rings are placed under tension and, additionally, are displaced or deflected axially. As a result of this arrangement, each of the flexible members 75 bears with substantially line contact and at relatively high unit pressure against the end portions of the inner race member, at points lying axially outwardly of the outer bearing race 51.

By having the sealing members 70 carried within the bearing housing 57 while arranged to engage directly the axially outer ends of the inner bearing race member, the construction is materially simplified in that it is not necessary to provide any other accurately machined surface, such as a sleeve, shaft or the like, upon which to have the sealing members bear; instead, the sealing members 75, while carried by the relatively stationary bearing housing, contact the inner bearing race directly, this member normally being a hardened and accurately machined part, and it can therefore function both as an inner race and as an accurately formed part having a smooth exterior surface to cooperate with the sealing elements of the bearing unit.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a disk harrow having a disk gang including a rotatable part, bearing means therefor, and a gang frame having a bearing-receiving bracket, the combination therewith of a bearing housing receiving said bearing means and having a pair of outwardly extending, generally cylindrical trunnions each flattened on its lower side so that the vertical dimension of each trunnion is less than the horizontal diameter thereof, a yoke attached to said bracket and having a pair of notched arms forming sockets rockably receiving said trunnions, said arms normally extending downwardly and each of said sockets having a diameter substantially equal to the diameter of the associated trunnion, said yoke having upwardly extending narrowed openings leading to said sockets, the width of each of said narrowed openings being substantially equal to the aforesaid vertical dimension of the associated trunnion, thus providing for assembly of the notched ends onto the trunnions from a lateral position, the portion of each of said sockets opposite the narrowed opening thereof being swingable up onto the upper cylindrical part of the associated trunnion when the yoke is swung from a lateral position upwardly to a generally vertical position.

2. For use in a disk harrow having a disk gang including a normally horizontal rotatable part, bearing means therefor, and a gang frame having a normally horizontal bearing-receiving bracket disposed generally above said rotatable part, the improvement comprising a bearing housing adapted to receive and encircle said bearing means and having a pair of outwardly extending, generally horizontal trunnions, each of said trunnions being generally cylindrical, with flattened portions at their lower sides and cylindrical at their upper sides, a yoke attachable to said bracket and having a pair of notched arms extending downwardly at the ends of the bracket and the ends being shaped to form sockets for rockably receiving the upper cylindrical portions of said trunnions, said arms having narrowed openings at the lower ends of said arms leading upwardly to said sockets, the dimension of each of said narrowed openings corresponding to the thickness of the cylindrical portion of the associated trunnion between the uppermost point and the lower flattened portion thereof.

References Cited in the file of this patent

UNITED STATES PATENTS

| | | |
|---|---|---|
| 623,575 | Smith | Apr. 25, 1899 |
| 1,206,768 | Wheary | Nov. 28, 1916 |
| 1,333,883 | Thomason | Mar. 16, 1920 |
| 1,478,324 | Dina | Dec. 18, 1923 |
| 2,097,244 | Sjogren et al. | Oct. 26, 1937 |
| 2,405,122 | Firth | Aug. 6, 1946 |
| 2,580,508 | Birdwell | Jan. 1, 1952 |